No. 702,187. Patented June 10, 1902.
A. C. EGGERS.
BOX FOR FOUNTAIN SYRINGES.
(Application filed Feb. 14, 1902.)
(No Model.)
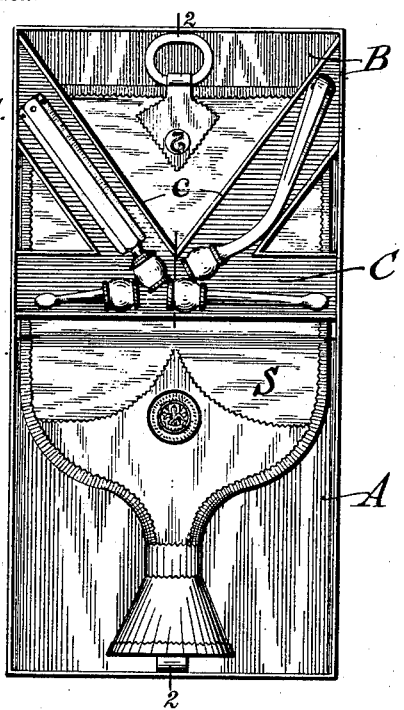
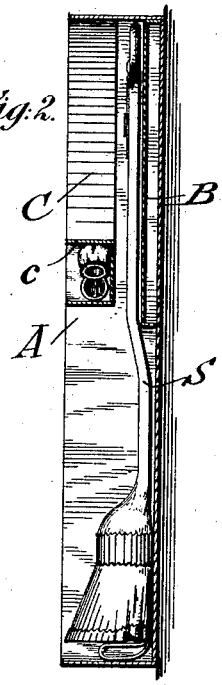
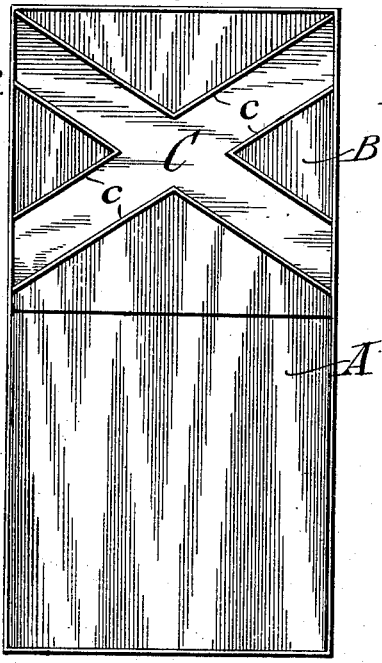
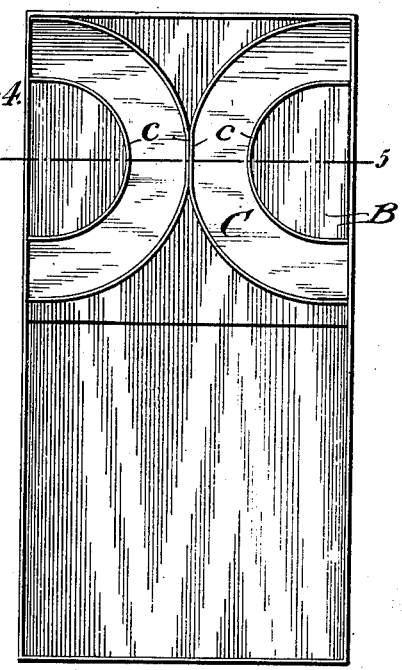
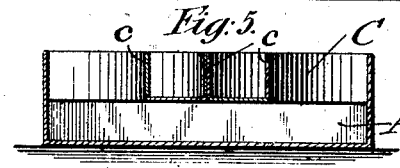

UNITED STATES PATENT OFFICE.

ANTON C. EGGERS, OF NEW YORK, N. Y., ASSIGNOR TO THE GOODYEAR INDIA RUBBER GLOVE MANUFACTURING COMPANY, OF NEW YORK, N. Y., A CORPORATION OF CONNECTICUT.

BOX FOR FOUNTAIN-SYRINGES.

SPECIFICATION forming part of Letters Patent No. 702,187, dated June 10, 1902.

Application filed February 14, 1902. Serial No. 94,078. (No model.)

*To all whom it may concern:*

Be it known that I, ANTON C. EGGERS, a citizen of the United States, residing in New York, borough of Brooklyn, and State of New York, have invented certain new and useful Improvements in Boxes for Fountain-Syringes, of which the following is a specification.

This invention relates to an improved box for packing a fountain-syringe and nozzle attachments in a convenient and attractive manner, so that the same is in pleasing and ready form for exhibition for sale; and for this purpose the invention consists of a box for a fountain-syringe and nozzle attachments which comprises an open body, a trough-like frame forming openings between it and the edges of the box, so as to exhibit the body of the fountain-syringe, and provided with space for storage of the nozzles and other parts of the syringe; and the invention consists, further, of a box for a fountain-syringe.

In the accompanying drawings, Figure 1 is a front elevation of my improved box for a fountain-syringe with the cover removed and showing the syringe in position therein. Fig. 2 is a vertical transverse section on line 2 2, Fig. 1. Figs. 3 and 4 are modified constructions of my improved box for a fountain-syringe; and Fig. 5 is a vertical transverse section on line 5 5, Fig. 4.

Similar letters of reference indicate corresponding parts.

Referring to the drawings, A represents the body of my improved box for a fountain-syringe. The box is made of a size corresponding to the size of the syringe. The syringe S is placed on the bottom of the box. The upper portion thereof is preferably supported on a raised portion B, which is attached to the bottom of the box and which serves for the purpose of raising the upper portion of the body of the fountain-syringe, so as to bring it in a plane with the larger funnel-shaped mouth of the same. Above the raised portion B is arranged in the body A a trough-like frame C, of pasteboard, having raised side walls c, that extend to a level with the edges of the body of the box, said frame being made either approximately of two V-shaped portions, as shown in Fig. 3, or of two semicircular or curved portions, as shown in Fig. 4, or in any other suitable shape. This frame serves for the storage of nozzles and other attachments used with fountain-syringes, so that they are retained in said frame independently of the body of the fountain-syringe placed in the bottom of the box without requiring special packing material for keeping them in position, as when stored in the bottom of the box.

In some cases the raised portion B may be dispensed with, as shown in Fig. 5, in which case the height of the box may be slightly diminished. This form of box may be used with cheaper qualities of syringes; but for the better qualities the raised portion B is preferred, as thereby the body of the syringe is exhibited in a more advantageous manner, being brought up closely to the frame C, so as to fill up the open space below the same, as shown in Fig. 1.

Having thus described my invention, I claim as new and desire to secure by Letters Patent—

A box for fountain-syringes, consisting of an open box, a raised portion on the base thereof, at one end, and a trough-like frame arranged in said box above said raised portion and supported therefrom, the side walls of said raised portion extending to the level of the sides of said box, said trough-like frame forming openings between its side walls and the sides of the box, substantially as set forth.

In testimony that I claim the foregoing as my invention I have signed my name in presence of two subscribing witnesses.

ANTON C. EGGERS.

Witnesses:
PAUL GOEPEL,
C. BRADWAY.